(12) United States Patent
Dunlap

(10) Patent No.: US 9,930,993 B2
(45) Date of Patent: Apr. 3, 2018

(54) FOOD WARMING DEVICE

(71) Applicant: Lorene Dunlap, Decatur, GA (US)

(72) Inventor: Lorene Dunlap, Decatur, GA (US)

( * ) Notice: Subject to any disclaimer, the term of this patent is extended or adjusted under 35 U.S.C. 154(b) by 0 days.

(21) Appl. No.: 14/796,106

(22) Filed: Jul. 10, 2015

(65) Prior Publication Data

US 2016/0022094 A1 Jan. 28, 2016

Related U.S. Application Data

(60) Provisional application No. 62/029,748, filed on Jul. 28, 2014.

(51) Int. Cl.
*A47J 41/00* (2006.01)
*A47J 39/00* (2006.01)
*A47J 27/21* (2006.01)

(52) U.S. Cl.
CPC ......... *A47J 39/00* (2013.01); *A47J 27/21041* (2013.01); *A47J 41/0038* (2013.01)

(58) Field of Classification Search
CPC ..... A47J 41/00; A47J 41/0005; A47J 41/0038
USPC .......... 99/285, 288, 453, 422, 426; 219/439, 219/438, 433, 549, 735, 432, 441, 387, 219/436, 415; 220/592.27, 592.2, 475.1
See application file for complete search history.

(56) References Cited

U.S. PATENT DOCUMENTS

| 3,385,952 A | 5/1968 | Mix |
| 3,610,884 A | 10/1971 | Evans |
| 3,869,595 A * | 3/1975 | Collins ................... A45C 11/20 219/387 |
| 3,974,358 A | 8/1976 | Goltsos |
| 4,316,078 A | 2/1982 | Mack et al. |
| 4,658,117 A | 4/1987 | Sayward, Jr. |
| 6,153,859 A * | 11/2000 | Taylor ................ A47J 27/21041 219/439 |
| 6,179,155 B1 * | 1/2001 | Komiya .............. A47J 41/0072 220/560.13 |
| 6,550,172 B2 | 4/2003 | Korpai |
| 6,943,323 B2 * | 9/2005 | Iannucci ................ A47J 41/005 219/387 |
| 8,757,404 B1 * | 6/2014 | Fleckenstein ....... A47J 41/0005 206/217 |
| 2008/0078771 A1 * | 4/2008 | Tsukahara .......... B65D 81/3823 220/592.2 |
| 2008/0237244 A1 * | 10/2008 | Tsukahara .............. F01P 11/029 220/592.27 |

(Continued)

*Primary Examiner* — Michael Laflame, Jr.
(74) *Attorney, Agent, or Firm* — Global Intellectual Property Agency, LLC; Jordan Sworen

(57) ABSTRACT

A food and beverage warming device. The warming device comprises a housing that preferably resembles a thermos or a pot. The housing includes an interior volume defining a heating chamber in which food can be placed for heating. The housing includes a heating element operated via a control switch for electrically heating the food within the heating chamber. The control switch allows the user to adjust the temperature of the heating element. The housing further includes a lid having a hollow interior volume so that the lid can be used as a bowl or cup. Further, the housing may removably enclose a serving tray on which food can be heated and served. The warming device may include its own power source or may be powered via an electrical connection to a wall outlet or other conventional power source.

12 Claims, 3 Drawing Sheets

(56) References Cited

U.S. PATENT DOCUMENTS

| | | | | |
|---|---|---|---|---|
| 2009/0283533 A1* | 11/2009 | Hemminger | ......... | B65D 43/022 220/592.17 |
| 2011/0132893 A1* | 6/2011 | Lin | ......... | A45F 3/18 219/441 |
| 2012/0312031 A1* | 12/2012 | Olsen | ......... | F25B 21/02 62/3.62 |
| 2013/0175250 A1* | 7/2013 | Saatkamp | ......... | A47J 39/02 219/387 |

* cited by examiner

FOOD WARMING DEVICE

CROSS REFERENCE TO RELATED APPLICATION

This application claims the benefit of U.S. Provisional Application No. 62/029,748 filed on Jul. 28, 2014. The above identified patent application is herein incorporated by reference in its entirety to provide continuity of disclosure.

BACKGROUND OF THE INVENTION

Field of the Invention

The present invention relates to food warming devices. More specifically, the present invention provides a food warming device that comprises a housing having a heating chamber in which food can be heated via a heating element disposed within the housing. A lid is removably securable to the open upper end of the housing for enclosing the heating chamber, and the lid may comprise an interior volume so that it can serve as a bowl or cup.

People often use a microwave or oven in order to heat food prior to consumption. However, people do not always have access to a microwave or oven, and as a result people may have to eat cold food. This can be inconvenient and undesirable as many foods are more palatable when heated. Further, many foods must be heated prior to consumption and lack of access to a microwave or oven may limit a person's food options.

Further, even if a microwave is available for use, sharing a microwave can be undesirable. For example, people who work in an office may share a microwave and may use the microwave to heat their lunches. Workers generally have limited break or lunch periods and waiting in line to use a microwave can be time consuming and inconvenient. Additionally, microwaves can quickly become dirty or unsanitary when used by multiple people. Thus, a portable food warming device adapted to provide a convenient means for heating and serving food is desired.

Devices have been disclosed in the prior art that relate to food warming devices. These include devices that have been patented and published in patent application publications. Various devices have been disclosed that generally relate to portable food warming appliances having heating elements for warming food placed therein, such as U.S. Pat. No. 3,814,900, U.S. Pat. No. 3,610,884, U.S. Pat. No. 3,385,952, U.S. Pat. No. 3,974,358, U.S. Pat. No. 4,658,117, and U.S. Pat. No. 4,316,078.

However, these prior art devices have several known drawbacks. The devices in the prior art fail to provide devices shaped similarly to a thermos or pot that include heating elements for warming food placed therein. Further, the prior art devices do not disclose a lid that can be used to cover the heating chamber of the food warming device and that can also be used as a bowl or cup for serving the warmed food. Additionally, the devices in the prior art fail to provide a serving tray that can be heated within the heating chamber of the food warming device and that can be stored therein when not in use.

In light of the devices disclosed in the prior art, it is submitted that the present invention substantially diverges in design elements from the prior art and consequently it is clear that there is a need in the art for an improvement to existing food warming devices. In this regard the instant invention substantially fulfills these needs.

SUMMARY OF THE INVENTION

In view of the foregoing disadvantages inherent in the known types of food warming devices now present in the prior art, the present invention provides a new food warming device wherein the same can be utilized for providing convenience for the user when heating food prior to consumption.

It is therefore an object of the present invention to provide a new and improved food warming device that has all of the advantages of the prior art and none of the disadvantages.

It is another object of the present invention to provide a food warming device comprising a housing with a heating chamber and a heating element adapted to heat food placed therein.

Another object of the present invention is to provide a food warming device comprising a lid for enclosing the heating chamber, wherein the lid further serves as a bowl or cup for serving the heated food.

Yet another object of the present invention is to provide a food warming device resembling a thermos or a pot.

A further object of the present invention is to provide a food warming device having a rounded configuration, and further having a serving tray removably stored therein.

An additional object of the present invention is to provide a food warming device having one or more control switches for adjusting the temperature of the heating element therein.

Yet another object of the present invention is to provide a food warming device that is portable for ease of transportation by the user.

Another object of the present invention is to provide a food warming device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figures 1, 2:
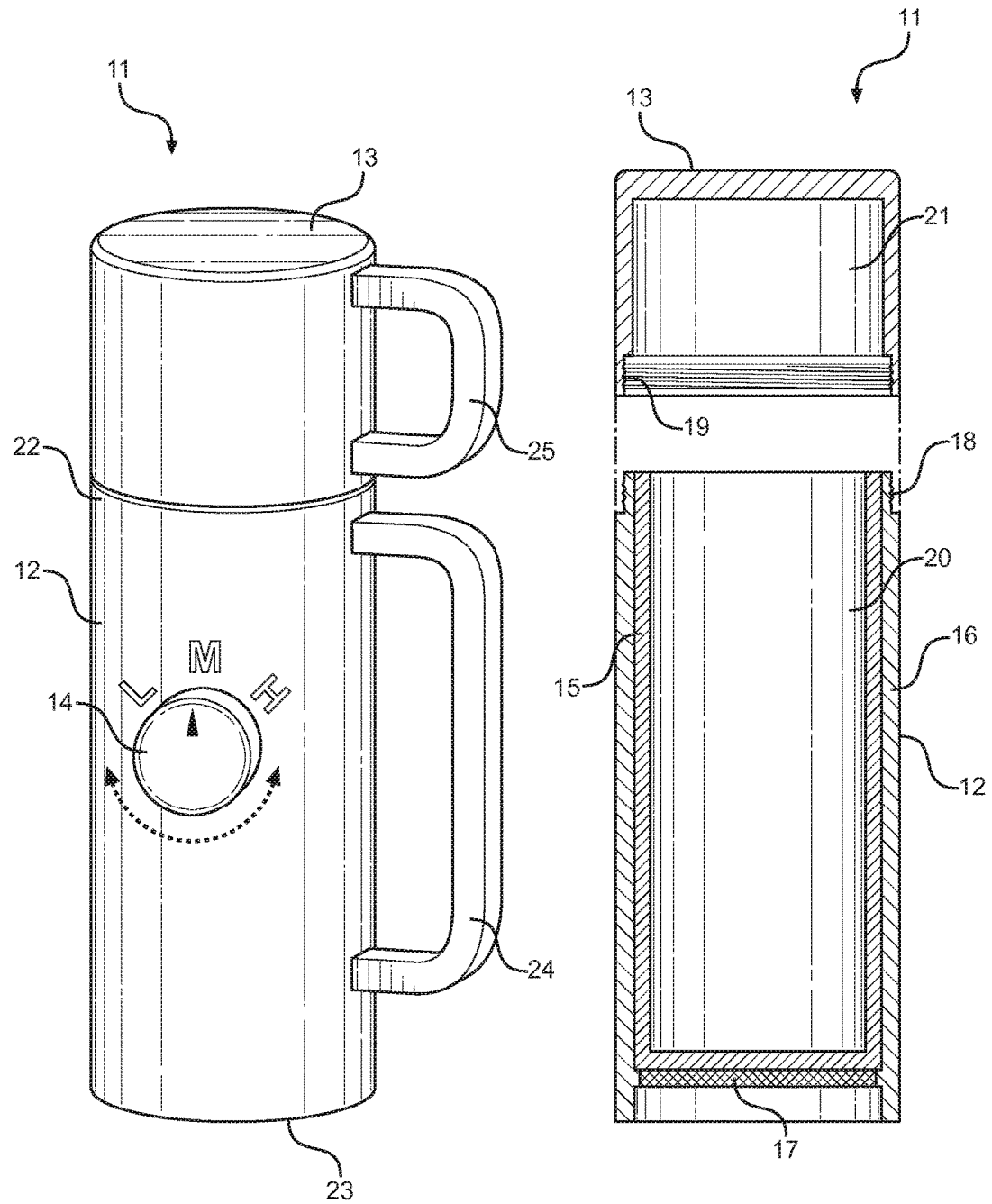
FIG. 1 shows a perspective view of an embodiment of the food warming device.
FIG. 2 shows a cross sectional view of the food warming device.

Reference is made herein to the attached drawings. Like reference numerals are used throughout the drawings to depict like or similar elements of the food warming device. For the purposes of presenting a brief and clear description of the present invention, the preferred embodiment will be discussed as used for heating food and providing the user with means for serving the heated food. The figures are intended for representative purposes only and should not be considered to be limiting in any respect.

Referring now to FIGS. 1 and 2, there are shown views of an embodiment of the food warming device. The food warming device 11 comprises a housing 12 and a lid 13 removably secured thereon. In the illustrated embodiment, the housing 12 comprises a cylindrical configuration so as to resemble a thermos. The housing 12 comprises a base 23, sidewalls, and an open upper end 22, defining an interior volume which serves as a heating chamber 20.

A lid 13 is removably securable to the upper end 22 of the housing 12 and serves to enclose the upper end of the housing 12 and heating chamber 20. The lid 13 may be secured via a press fit or via other fastening methods. The lid 13 is shown as having internal threading 19 so as to secure to threading 18 on the upper end 22 of the housing 12. Further, the lid 13 preferably includes a hollow interior volume 21 so as to serve as a bowl or cup for serving food. In this way, the user can warm food using the heating chamber 20 of the food warming device 11 and can pour or place the food into the interior volume 21 of the lid 13 for serving.

The heating chamber 20 within the housing 12 includes a heating element 17 for increasing the temperature thereof. The heating chamber 20 is defined by a heat conducting material 15, such as metal, so that the heating chamber 20 can evenly heat the food within the heating chamber 20. A heating element 17 is positioned below the heating chamber 20 and is adapted to increase the temperature thereof so as to cook food placed within the heating chamber 20. The heating element 17 preferably comprises electrical resistance coils that increase in temperature as current flows therethrough. Alternative types of heating elements 17 may be used in alternate embodiments. Further, the heating element 17 can be disposed substantially around the heating chamber 20 in alternate embodiments. An insulating layer 16 surrounds the heating chamber 20 and heating element 17 and is composed of an insulating material so that heat from the heating chamber 20 and heating element 17 is not transferred through the housing 12. In this way, the exterior of the housing 12 remains cool to the touch so that the user can hold the food warming device 11 without burning himself or herself.

The housing 12 further includes one or more control switches 14 on the exterior thereof, wherein the control switches 14 are adapted to control the operation of the heating element 17. The user can adjust the heat setting between various temperatures, such as a low heat setting, a medium heat setting, and a high heat setting. Each heat setting may correspond to a specific temperature. Further, the control switch 14 may provide a timer for allowing the user to more easily monitor the length of time that the food is cooking. A control switch 14 is also provided for turning the heating element 17 of the device on or off.

Figure 3:
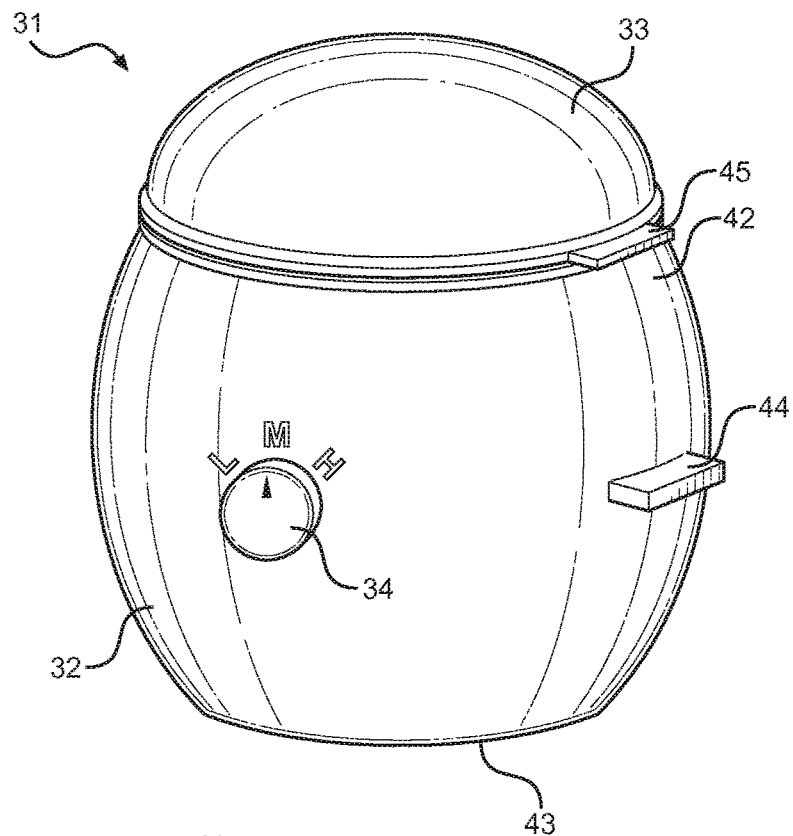
FIG. 3 shows a perspective view of an alternate embodiment of the food warming device.
Figure 4:
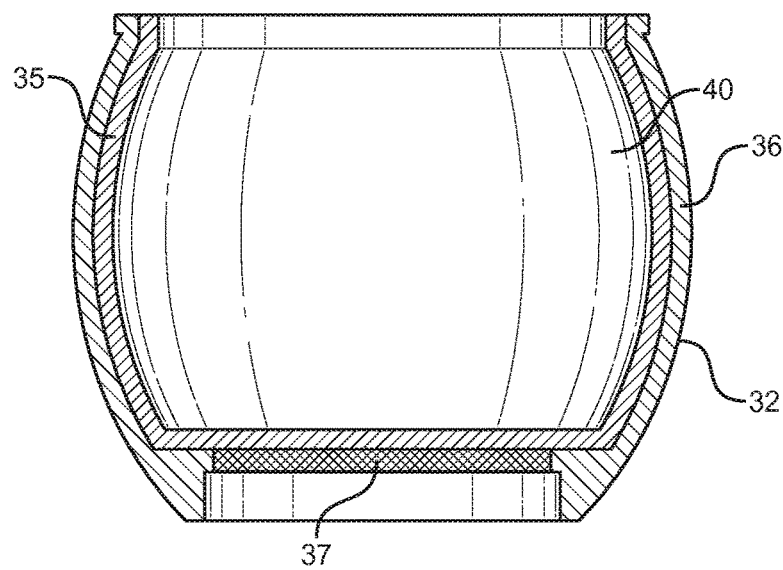
FIG. 4 shows a cross sectional view of an alternate embodiment of the food warming device.

Referring now to FIGS. 3 and 4, there are shown views of an alternate embodiment of the food warming device. In the illustrated embodiment, the food warming device 31 comprises a housing 32 having a rounded configuration, similar to a pot. The housing 32 includes a base 43, sidewalls, and an open upper end 42. Preferably, the upper end 42 has a circular opening. The housing 32 may further include one or more handles 44 on the sidewalls thereof for facilitating carrying and moving the housing 32. A lid 33 is removably secured over the opening on the upper end 42 of the housing 32. The lid 33 can be secured via threading thereon, press fit, or can be loosely positioned over the upper end 42 of the housing 32. The lid 33 encloses the housing 32 and the heating chamber 40 therein. Further, the lid 33 comprises a hollow interior volume 41 so that it can be used as a cup or bowl for serving food. The lid 33 also includes one or more handles 45 for allowing the lid 33 to be easily held and positioned over the housing 32.

The housing 32 comprises a heating chamber 40 in which food can be positioned for heating. The heating chamber 40 comprises a heat conducting material 35 that increases in temperature as a heating element 37 in contact with the heat conducting material 35 increases in temperature. The heating chamber 40 and heating element 37 is enclosed within an insulating layer 36 that allows the exterior of the housing 32 to remain cool to the touch.

Figure 5:
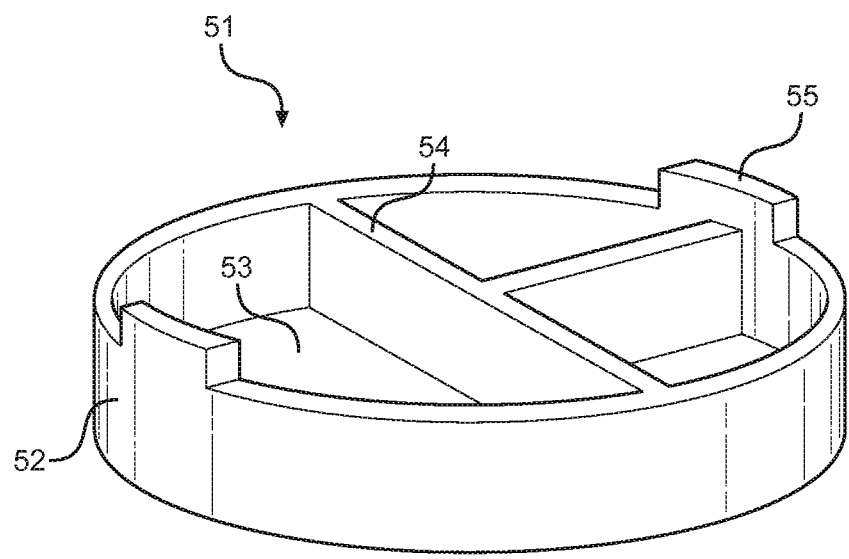
FIG. 5 shows a perspective view of a serving tray storable within the food warming device.

Referring now to FIG. 5, there is shown a perspective view of a serving tray storable within the food warming device. A serving tray 51 is provided and is adapted to be positioned within the heating chamber of the food warming device for heating food place thereon. The serving tray 51 preferably comprises a circular construction so as to fit within the heating chamber. The serving tray 51 comprises a base 53, upstanding sidewalls 52, and an open upper end, defining an interior volume in which food can be positioned. The interior volume may include one or more dividing walls 54 for separating the interior volume into multiple compartments. In this way, the user can organize food on the serving tray 51 and can place the serving tray 51 in the heating chamber so as to warm the food thereon. The serving tray 51 further includes one or more handles 55 for allows the user to easily grasp and move the same. The serving tray 51 is preferably composed of a material having low thermal conductivity, such as a ceramic material, so that the food thereon can be heated while the serving tray 51 remains at a relatively low temperature.

Figure 6:
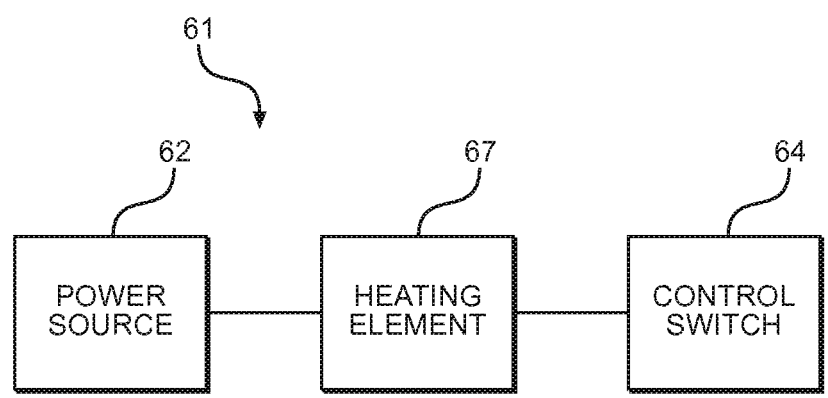
FIG. 6 shows a schematic diagram of the electrical components of the present invention.

Referring now to FIG. 6, there is shown a schematic diagram of the electrical components of the present invention. The food warming device comprises a housing that encloses the necessary electrical circuitry 61 to provide power to the heating element therein. The heating element 67 is operably connected to a control switch 64, wherein the control switch 64 allows the user to control the temperature setting of the heating element 67. The heating element 67 is powered via a power source 62. The power source 62 may be enclosed within the housing of the food warming device, wherein the power source 62 comprises one or more rechargeable batteries. In alternate embodiments, the power source 62 is a conventional electrical outlet or the lid, wherein the device includes an electrical cable adapted to be connected to such a power source.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A food warming device, comprising:
    a housing having an open upper end and an interior volume, wherein said interior volume comprises a heating chamber in which food can be positioned for heating;
    a heating element disposed within said housing adapted to heat said heating chamber;
    a control switch in electrical communication with said heating element, and adapted to allow a user to increase or decrease the temperature of said heating element;
    a lid removably secured to said housing for enclosing said heating chamber, wherein said lid comprises a hollow interior volume adapted for use in serving said food;
    wherein said heating chamber is defined by a thermally conductive material having a base and one or more sidewalls;
    wherein said heating element is coextensive with said base of said thermally conductive material, such that said heating element does not extend beyond a perimeter of said base of said thermally conductive material;
    wherein said housing further comprises an insulating layer surrounding said heating chamber and said heating element;
    said one or more sidewalls of said thermally conductive material rest flush against said insulating layer;
    wherein the insulating layer comprises the outermost layer of the housing, wherein the heating element contacts a bottom of the heating chamber.

2. The food warming device of claim 1, wherein said housing resembles a thermos.

3. The food warming device of claim 2, wherein said thermos comprises a cylindrical configuration having a base, sidewalls, and an open upper end.

4. The food warming device of claim 1, wherein said heating element comprises electrical heating coils.

5. The food warming device of claim 1, wherein said housing further encloses a power source therein, wherein said power source is in electrical communication with said heating element.

6. The food warming device of claim 1, wherein said housing resembles a rounded pot.

7. The food warming device of claim 6, wherein said rounded pot comprises a rounded configuration having a base, sidewalls, and an open upper end that provides access to said heating chamber.

8. The food warming device of claim 1, further comprising a serving tray having a base and sidewalls, wherein said serving tray is adapted to hold food thereon, and wherein said serving tray is adapted to fit within said heating chamber.

9. The food warming device of claim 8, wherein said serving tray comprises a circular construction so as to fit within said heating chamber.

10. The food warming device of claim 1, wherein said heating element is disposed below said heating chamber, wherein said heating element is in contact with said heating chamber.

11. The food warming device of claim 1, wherein said heating element substantially surrounds said heating chamber.

12. The food warming device of claim 1, wherein the insulating layer comprises a non-gaseous material.

* * * * *